S. C. ARNOLD.
KITCHEN UTENSIL.
APPLICATION FILED SEPT. 29, 1908.

930,917.

Patented Aug. 10, 1909.

WITNESSES:
Thos. W. Riley
M. A. Newcomb

INVENTOR
S. C. Arnold
BY
W. J. FitzGerald & Co.
Attorneys

UNITED STATES PATENT OFFICE.

SAMUEL C. ARNOLD, OF OTTAWA, OHIO.

KITCHEN UTENSIL.

No. 930,917.   Specification of Letters Patent.   Patented Aug. 10, 1909.

Application filed September 29, 1908. Serial No. 455,337.

*To all whom it may concern:*

Be it known that I, SAMUEL C. ARNOLD, a citizen of the United States, residing at Ottawa, in the county of Putnam and State of Ohio, have invented certain new and useful Improvements in Kitchen Utensils; and I do hereby declare the following to be a full, clear, and exact description of the invention, such as will enable others skilled in the art to which it appertains to make and use the same.

This invention relates to new and useful improvements in utensils, such as basins, dish pans, buckets, and the like, in which articles are to be cleansed and my object is to provide means for retaining soap in position on the utensil, whereby the same may be conveniently reached when it is desired to use the same.

A further object is to provide means for draining the soap after the same has been used and deposited in its receptacle.

A further object is to provide means for returning the drainage to the interior of the utensil.

A still further object is to so construct the receptacle and attach the same to the utensil, as to avoid obstructing ready access to the interior of the utensil and a still further object is to provide a combined brace and handle between the receptacle and utensil.

Other objects and advantages will be hereinafter referred to and more particularly pointed out in the claims.

Figure 1:
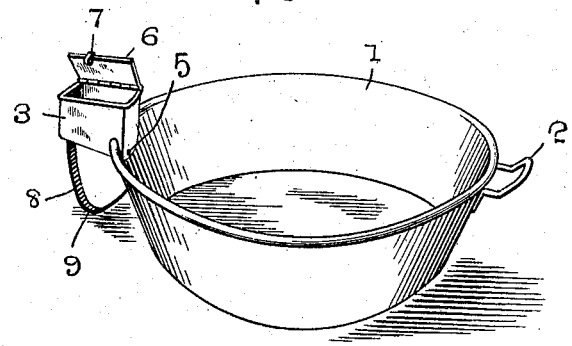
Figure 2:
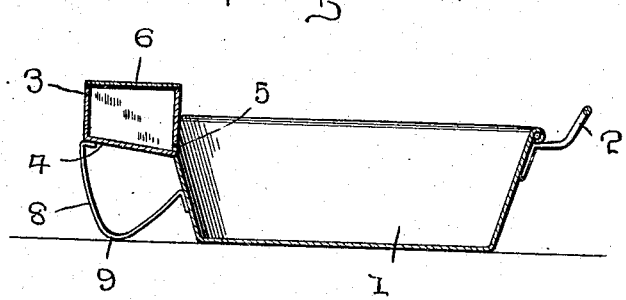
Figure 3:
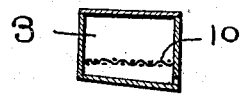

In the accompanying drawings which are made a part of this application, Figure 1 is a perspective view of a utensil showing my improved form of soap receptacle attached thereto. Fig. 2 is a transverse vertical sectional view through the utensil and receptacle, and, Fig. 3 is a sectional view showing a modified form of attachment.

Referring to the drawings in which similar reference numerals designate corresponding parts throughout the several views, 1 indicates a utensil which may be of any preferred construction having adjacent its upper edge the usual form of hand grasp 2.

Secured to the utensil 1 at a point diametrically opposite the hand grasp 2, is my improved form of soap receptacle 3, the side and end walls of which are preferably vertical, while the bottom 4 is preferably inclined from its outer to its inner end. In securing the receptacle to the utensil, a portion of the wall of the utensil is removed and the receptacle entered into the recess thus made and as the wall of the utensil, as shown, is inclined, the inner inclined end of the bottom 4 is to be placed flush with the inner face of the wall of the utensil, while the upper edge of the utensil extends outwardly from the inner end of the receptacle and engages the side walls of the receptacle, thereby lending rigidity to the receptacle and at the same time disposing the end of the receptacle in such position that articles in the utensil will not catch on said end.

The object in inclining the bottom 4 is to thoroughly drain the soap after the same has been used and in order to return the drainage to the interior of the utensil, the inner end wall of the receptacle may be provided with one or more openings 5, through which the drainage may pass into the interior of the utensil.

The receptacle 3 is preferably provided with a cover 6, which cover is hingedly secured to the upper edge of the receptacle and is provided with any suitable form of spring latch 7, so that said cover will be normally held in its closed position. The side walls and bottom of the receptacle 3 are preferably soldered to the engaging portion of the wall of the utensil and as the major portion of the receptacle extends beyond the wall of the utensil, a brace 8 is extended from the outer end of the receptacle 3 to the face of the utensil 1, the brace, in its passage from the receptacle to the utensil, extending downwardly from the outer end of the receptacle to a point in line with the bottom of the utensil to form a bearing point 9 and thence upwardly at an angle and into engagement with the outer face of the utensil, the ends of the brace being secured in any preferred manner to the receptacle and utensil, respectively. In addition to providing a rigid support for the receptacle the brace 8 is also to be used in connection with the hand grasp 2 for transporting the utensil, said brace compensating for the absence of the hand grasp necessarily removed in attaching the soap receptacle to the utensil.

In Fig. 3 of the drawings, I have shown an auxiliary bottom 10, which is perforate or formed of woven wire, so that the soap will be supported above the inclined bottom 4, in which event the drainage will more freely pass from the receptacle into the utensil.

It is primarily intended to remove the soap from the receptacle and place the same into the water contained in the utensil to form suds, but it will be clearly apparent that by giving a rocking movement to the utensil and thereby directing the water through the opening 5 and into engagement with the soap within the receptacle, suds will be produced without removing the soap from the receptacle and that as soon as the utensil is lowered to its natural position, the water will quickly drain from the receptacle and this operation may be readily accomplished by curving the bearing portion 9 of the brace 8, as shown.

It will thus be seen that I have provided a very cheap and economical form of receptacle for retaining soap in position to be readily obtained when desired and one wherein the soap will be thoroughly drained after being immersed in water. It will further be seen that by attaching the receptacle to the utensil in the manner shown and providing the bracing member, said receptacle will be rigidly held in position and while I have shown the receptacle as applied to use in connection with the usual form of dish pan, it will be readily understood that the same may be attached to various forms of utensils.

What I claim is:

1. An utensil comprising a pan, having fixed in its upper edge a soap-holding receptacle, whose bottom is inclined toward said pan, said receptacle having fixed to its outer bottom edge, a grip forming loop, said loop having its inner end fixed to said pan.

2. An utensil comprising a pan having fixed in its upper edge, a soap-holding receptacle, whose bottom is inclined toward said pan, said receptacle having fixed to its outer bottom edge, one end of a grip forming loop, the opposite end of said loop being secured to said pan, said loop being bowed downwardly and having its lower part lying in the same plane with the bottom of said pan.

In testimony whereof I have signed my name to this specification in the presence of two subscribing witnesses.

SAMUEL C. ARNOLD.

Witnesses:
EFFIE L. ARNOLD,
E. F. WIESER.